July 28, 1964  J. H. SHEPLEY  3,142,393
BALE THROWER
Filed Jan. 18, 1962
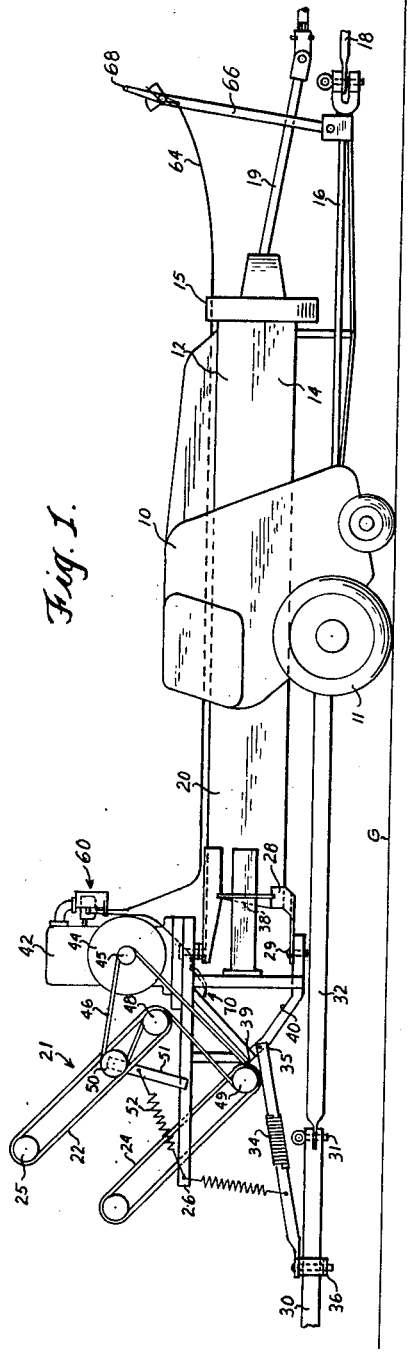
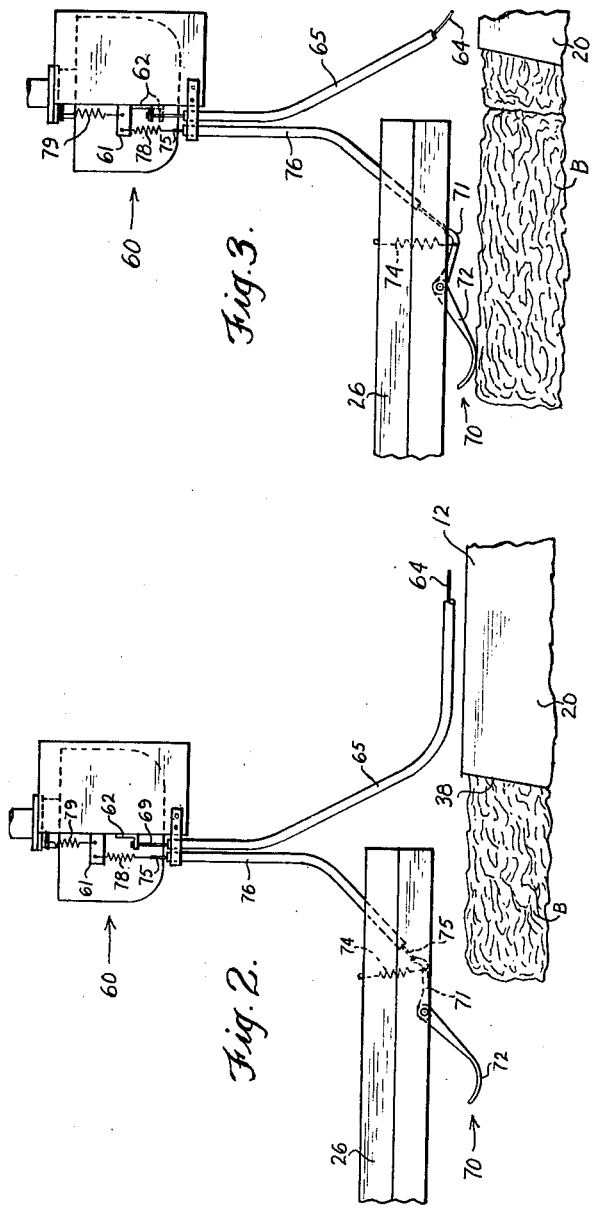
INVENTOR.
JOHN H. SHEPLEY
BY Joseph A. Brown
ATTORNEY

United States Patent Office 3,142,393
Patented July 28, 1964

3,142,393
BALE THROWER
John H. Shepley, Lancaster, Pa., assignor to Sperry Rand Corporation, New Holland, Pa., a corporation of Delaware
Filed Jan. 18, 1962, Ser. No. 167,067
3 Claims. (Cl. 214—83.36)

This invention relates to devices adapted to be mounted on hay balers to receive bales therefrom and to throw them into trailing wagons. More particularly, the invention relates to an improvement in a bale thrower of the type having a variable speed engine for operating the thrower.

Heretofore, a bale thrower has been provided having two continuously moving high speed belts as throwing elements. The belts are located to engage opposite sides of each emerging bale to impart a throwing action thereto. The belts are driven by a high speed engine. Remote control means is provided for by varying the high speed of the engine whereby the distance a given bale will be thrown can be varied. Between throws, and also when the baler is making a turn and hay is not being picked up, the bale thrower engine continues to run at high speed.

One object of this invention is to provide, in combination with a bale thrower of the character described, a control device to automatically throttle down the bale thrower engine while a bale is emerging to be thrown and to speed up the thrower just before the bale reaches the throwing belts.

Another object of this invention is to provide means for adjusting the throwing speed of the throwing belts without interfering with the automatic throttling means.

A further object of this invention is to provide throttle control structure of the character described which is relatively inexpensive to manufacture and install.

Other objects of this invention will be apparent hereinafter from the specification and from the recital in the appended claims.

In the drawing:

FIG. 1 is a side elevation of a hay baler having a bale thrower mounted thereon, the power to the thrower being regulated by a control device constructed according to this invention;

FIG. 2 is an enlarged side elevation of the control device showing the parts in idle position as a bale is emerging from the baler; and FIG. 3 is a view similar to FIG. 2 showing the device actuated to operate the thrower at throwing speed responsive to bale emergence.

Referring now to the drawing by numerals of reference, and first to FIG. 1, 10 denotes generally a hay baler having wheels 11 which support the baler on the ground G. The baler includes a fore-and-aft extending bale case 12 having a forward end 14 on which a flywheel 15 is rotatably mounted. The baler has a forwardly extending tongue 16 connected to the drawbar 18 of a tractor, not shown, or other implement for towing the baler. Power is provided for operating the baler through a power take-off assembly 19 connected at its forward end to the power output shaft of the tractor and of its rear end to the flywheel 15.

The baler is adapted to travel from left to right in FIG. 1 to pick up cut and windrowed hay on the ground G and to form it into bales. The pickup and infeed mechanism may be similar to that shown in U.S. Patent No. 2,950,670. As the bales are formed in the bale case 12, they move progressively toward the rear end 20 of the bale case. After each bale is completed, it is banded with a suitable tying medium to form a complete package. Subsequently, the bale emerges from the rear or discharge end 20 of the bale case to be engaged by a bale thrower 21.

The bale thrower comprises a pair of throwing elements in the form of endless belts, namely upper belt 22 and lower belt 24. These belts extend at their trajecting angles around rollers 25 and they are adapted to travel at high speed in opposite directions when throwing a bale. The belts are spaced apart a distance substantially equal to the thickness of the bales being discharged so that the belts will firmly engage the top and bottom of emerging bales. The belts extend upwardly and rearwardly to exert a proper trajectory on the bales.

The belts 22 and 24 are carried on a frame structure 26 connected to the bale case 12 by brackets 28. Such connection includes vertically aligned pivots 29 whereby the bale thrower is laterally swingable relative to the baler so that the direction in which bales are thrown may be varied. The tongue 30 of a wagon, not shown, which trails behind the baler and receives the bales delivered by the thrower, is pivotally connected by a pin 31 to a drawbar 32 to be towed by the baler. A link arm 34 is provided which is connected at its forward end 35 to the thrower and at its rear end 36 to the tongue 30 to produce a swinging of the thrower responsive to changes in the direction of travel of the baler. This steers the thrower so that bales are always thrown toward the wagon.

The support frame 26 mounts the belts 22 and 24 of thrower 21 so that they are spaced rearwardly from the discharge terminal edge 38 of the bale case 12. The distance from the lower forward end 39 of belt 24 to the baler bale case is substantially equal to the length of the bales formed by the baler whereby each bale is substantially discharged and free of the bale case before there is any engagement with the throwing belts. When the bales leave the bale case 12, and before they are engaged by the throwing belts 22 and 24, they slide across a bottom support plate 40. Each emerging bale passes beneath the lower forward end of the upper belt 21 and is lifted into engagement with such belt only after the bale engages the lower belt 24.

For operating the bale thrower, a gasoline engine 42 is provided which is mounted on the thrower framework 26. The motor 42 has a flywheel 44 and coaxial therewith is a drive pulley 45. Extending around the drive pulley 45 is an endless belt 46 for operating the throwing belts 22 and 24. The endless belt 46 extends around drive pulleys 48 and 49 for the upper and lower belts respectively and around an idler pulley 50. The idler 50 is mounted on a support arm 51 pivoted to the frame 26 and biased towards tightening position by a spring 52. When viewed as shown in FIG. 1, the upper throwing belt 22 travels in a clockwise direction while the lower belt 24 travels counterclockwise.

For operating the engine 42, a throttle structure 60 is provided comprising a throttle member 61 which when in the position shown in FIG. 2 allows the engine to idle and when in the position shown in FIG. 3 causes the engine to operate at high speed. In like respect, when the throttle lever 61 is as shown in FIG. 2, the belts 22 and 24, while moving continuously, move at slow speed and when the throttle is in the position shown in FIG. 3, the belts travel at a rapid, throwing speed. For regulating the operating, throwing speed of the engine 42, a stop 62 is slidably mounted on the throttle structure and engageable with lever 61. Stop 62 regulates the terminal high speed position of the throttle lever. The location of the stop 62 is variable at the will of the operator through a push pull cable 64 which extends through guide tube 65 along the bale case 12 and to a stand 66 at the front end of the baler. The stand 66 projects upwardly from the baler tongue 16 and control handle 68, within the reach of the tractor operator, is provided whereby the position of the stop 62 can be varied as desired. A variable position stop is provided so that the operator can vary the distance the bales will be thrown. When bales are thrown from the baler to an empty wagon, the operator begins by loading the wagon at the rear end thereof and progressively works forwardly. By varying the throwing speed of the thrower, the load in the wagon may be uniformly distributed fore-and-aft to provide a distributed, full load.

After a given bale has been thrown, six, seven or more seconds may elapse before the next bale is in position to be thrown. Such time interval is much greater when the baler reaches the end of a particular row and is making a turn to begin baling the material in the next adjacent row. To preserve the engine 42 and to allow it to operate at a lower speed when it is not actually driving the thrower at a throwing speed, a throttle control device 70 is provided. Device 70 allows engine 42 to idle while a bale is emerging and speeds the engine up to the throwing speed established by the location of the stop 62 when a bale is to be engaged by the belts 22 and 24. The device comprises a feeler element 71 pivotally mounted on the thrower frame 26. As shown in FIG. 2, the feeler element has a foot portion 72 which extends in the path of emerging bales B to be engaged thereby. When in normal position as shown in FIG. 2 a spring 74 holds the feeler pivoted in a counterclockwise direction. However, when the feeler element is engaged by an emerging bale, it is pivoted to the position shown in FIG. 3 against the resistance of the spring 74. When the bale has passed the feeler element and is thrown by the throwing belts 22 and 24, the spring 74 is able to become effective to return the element back to its normal position.

This pivoting of feeler element 71 is utilized to regulate the throttle of the engine 42. A cable 75 is connected to the feeler element and extends through a guide tube 76 for connection to the throttle control lever 61. A spring 78 between feeler 71 and lever 61 provides a lost motion in the connection to compensate for variations in the position of the stop 62. When the feeler element 72 pivots in a clockwise direction, a pulling force is exerted on the cable 75, such force being transmitted to the throttle lever 61 to pull it downwardly into engagement with the stop 62 and thereby speed up the throwing belts of the thrower. Once lever 61 engages stop 62, its movement ceases and spring 78 is extended upon further movement of cable 75. After the particular bale has been thrown, spring 74 pivots the feeler element back to normal position and the cable 75 is pushed to release location. A spring 79 is provided on the throttle lever to cooperate with spring 74 in returning lever 61 to its normal at-rest position, FIG. 2.

The feeler element 71 is located forwardly of the forward end of the upper belt 22 and substantially rearwardly of the edge 38 of the rear end 20 of bale case 12. Its location is such that as a bale emerges from the bale case 12, the engine 42 operates at an idling speed too. However, prior to engagement of the bale with the throwing belts, the feeler element is engaged to speed up the engine 42 so that the belts are operating at throwing speeds when the bale ultimately engages the belts. The location of the feeler element takes into consideration the time required to speed up the engine 42 and to get the belts 22 and 24 operating at throwing speeds before the bale to be thrown engages them.

With this arrangement, wear and tear on the engine 42 is minimized. Moreover, since the engine 42 operates at high speed only when a bale is to be thrown, fuel is saved reducing the cost of operation of the thrower. It will also be noted, that while the control device 70 idles and speeds up the engine 42, it in no way impairs the manual control of the high speed point of the thrower as controlled by the adjustable stop 62 under the operation of the tractor driver.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination, a hay baler adapted to travel forwardly and having a bale case in which bales are formed, said bale case having a rearward discharge end from which bales emerge in succession as the baler operates, a pair of bale trajecting members operable to engage and throw each bale distantly from the baler, means mounting said bale trajecting members on said bale case and spaced rearwardly of said discharge end such a distance that each bale is substantially discharged from the bale case before engagement with said trajecting members, means supporting each bale for movement across the space between said bale case discharge end and said trajecting members, an engine connected to said trajecting members and continuously imparting motion to the members, a throttle lever for said engine mounted for movement from a first position wherein the power means operates at a slow speed and a second position wherein the power means operates at a faster speed, means yieldably holding said throttle lever in said first position, a control element located between said bale case discharge end and said trajecting means, means mounting said control element for movement from a normal position projecting across the path of each emerging bale to a position alongside the path responsive to bale engagement, and means connecting said control element to said throttle lever to move the lever from said first and to said second position when the control element is moved from said normal position, said connecting means including a spring to allow further movement of said control element away from said normal position after said throttle has reached said second position, the location of said control element being such that as each bale emerges said engine operates at said slow speed and is speeded up to said faster speed proximate to engagement of the bale with said trajecting members.

2. The combination recited in claim 1 wherein a stop is provided with which said throttle lever is engageable when the throttle lever is in said second position, and means for adjusting the location of said stop whereby said faster speed of said engine is variable.

3. The combination recited in claim 2 wherein push-pull means is connected to said stop whereby the location thereof can be varied.

References Cited in the file of this patent

UNITED STATES PATENTS

| 710,574 | Grossmann | Oct. 7, 1902 |
| 2,144,717 | Ettl | Jan. 29, 1939 |
| 2,894,651 | Forth | July 14, 1959 |
| 3,055,519 | Hollyday | Sept. 25, 1962 |

OTHER REFERENCES

Catalog Model 49 Bale Thrower of the New Holland Machine Co., of New Holland, Pa., printed 12–1961.